Sept. 7, 1965            P. H. JOHNSON            3,205,275
SOLID CATALYST CONTACTING PROCESS AND APPARATUS THEREFOR
Filed Feb. 26, 1962
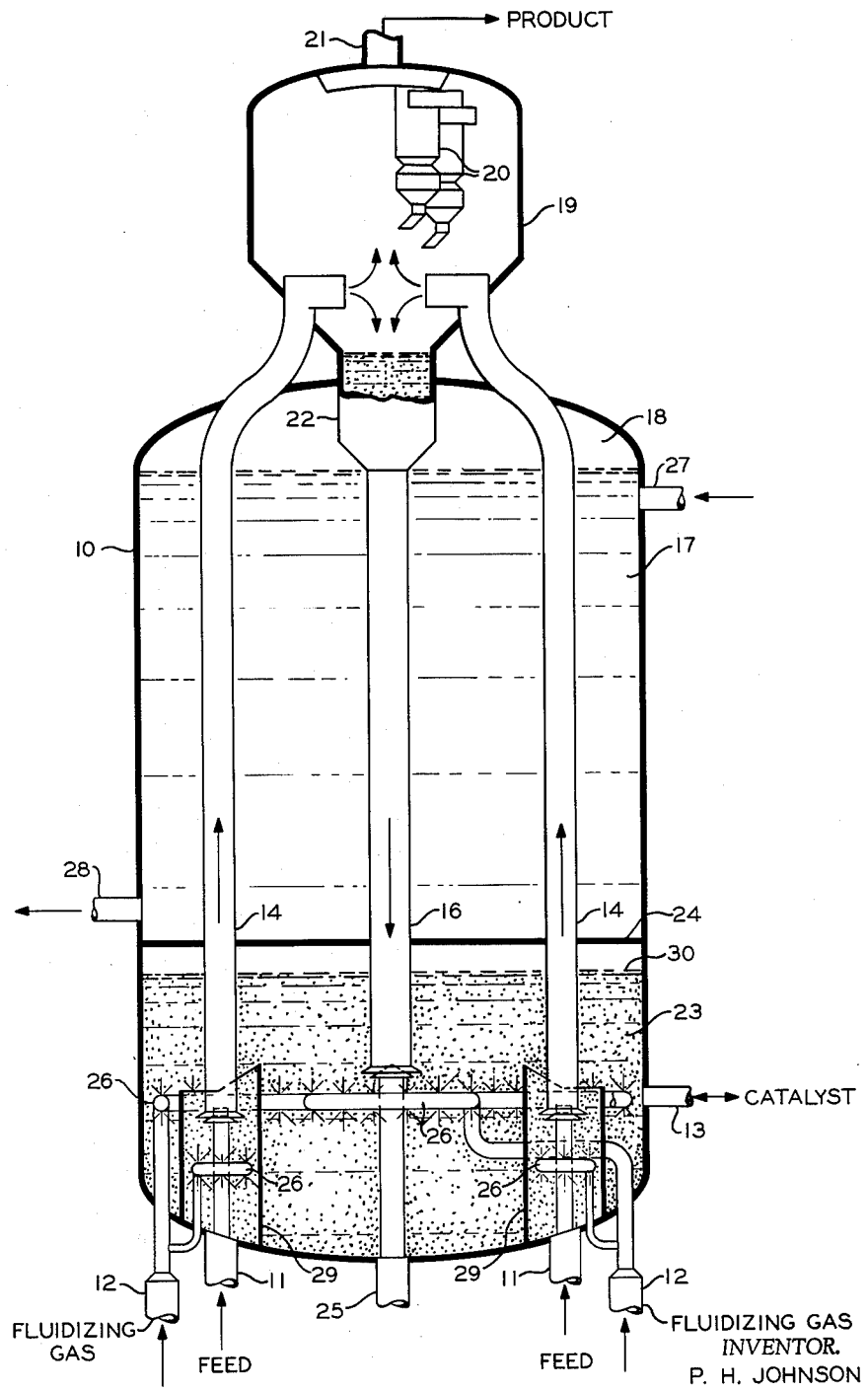
INVENTOR.
P. H. JOHNSON
BY *Young & Quigg*
ATTORNEYS

United States Patent Office 3,205,275
Patented Sept. 7, 1965

3,205,275
SOLID CATALYST CONTACTING PROCESS AND APPARATUS THEREFOR
Paul H. Johnson, Bartlesville, Okla., assignor to Phillips Petroleum Company, a corporation of Delaware
Filed Feb. 26, 1962, Ser. No. 175,759
3 Claims. (Cl. 260—667)

This invention relates to an improved catalytic process and apparatus therefor. In one specific aspect, this invention relates to an improved method of and apparatus for contacting a vaporous feed with a solid fluidized catalyst wherein the temperature of the reaction zone is controlled. In another specific aspect, this invention relates to an improved catalytic process wherein an exothermic reaction results from the contacting of a vaporous feed with a solid fluidized catalyst.

It is conventional to conduct highly exothermic reactions such as the hydrogenation of benzene, or the oxidation of naphthalene and xylene to phthalic anhydride, in fixed catalytic bed reactors. Although coolants can be employed to surround multiple small reactor tubes, the heat transfer to the coolant is relatively inefficient due to the tendency for the reaction to take place in a narrow zone within the catalyst bed.

I have discovered an improved exothermic catalytic process and apparatus therefor wherein a catalytic reaction employing a dilute phase fluidized catalyst is conducted in vertical tubes surrounded by coolant.

In the inventive catalytic process, the catalyst is carried upwardly from a contact zone through vertical tubes by the vaporous reactant feed, the ratio of the vaporous reactant feed to the catalyst controlled so that the catalytic reaction is completed in the length of tube exposed to the coolant. This, in effect, spreads the "hot zone" so as to effectively utilize to the fullest advantage the heat transfer surface. The catalyst, after the reaction is complete, is separated from the reaction zone effluent and returned to the contact zone, passing in indirect heat exchange with the coolant. In this manner, the temperature of the catalyst returned to the contact zone can be controlled.

Accordingly, an object of my invention is to provide an improved catalytic process and apparatus therefor.

Another object of my invention is to provide an improved method of and apparatus for controlling the temperature of a catalytic reaction zone.

Another object of my invention is to provide an improved method of and apparatus for controlling the reaction zone temperature of a catalytic process wherein a vaporous feed is reacted in the presence of a solid catalyst.

Another object of my invention is to provide an improved exothermic catalytic process and apparatus therefor.

Other objects, advantages, and features of my invention will be readily apparent to those skilled in the art from the following description and the appended claims.

Broadly, I have discovered that wherein a vaporous feed is reacted in the presence of a solid catalyst that effective temperature control of the reaction zone can be obtained by passing a vaporous reactant feed upwardly through vertical tubes surrounded by a heat exchange medium and by controlling the flow of catalyst through said vertical tubes, said flowing catalyst in continuous contact with said vaporous reactant feed. I have further discovered that the effectiveness of the catalytic process is improved by passing the catalyst separated from the reaction zone effluent in indirect heat exchange with said heat exchange medium.

The drawing is a cross-sectional vertical view of the inventive catalyst reactor.

Referring to the drawing, the inventive catalyst reactor 10 is illustrated as comprising a catalyst (contact) chamber 23, a heat exchange chamber 18, and a separation chamber 19. A solid catalyst bed level 30 is maintained in catalyst chamber 23. The catalyst within catalyst chamber 23 is maintained fluid by passing a fluidizing gas via conduit inlet means 12 to distributing rings 26 positioned within catalyst chamber 23.

A vaporous reactant feed is passed through a conventional hollow stem catalyst control valve 11 to catalyst chamber 23, said control valve 11 permitting the catalyst to be entrained in the proper proportion with the upward flowing reactant feed. The reactant feed and catalyst mixture flows upwardly through reactor tubes 14. The immediate zone of contact between the catalyst and the vaporous reactant feed is isolated from the remainder of catalyst chamber 23 by a baffle means 29.

The vaporous reactant feed and catalyst mixture flows upwardly through multiple reactor tubes 14 into heat exchange chamber 18. Heat exchange chamber 18 is separated from catalyst chamber 23 by a partition means 24. Indirect heat exchange is effected within heat exchange chamber 18 by means of a heat exchange medium 17 passed to heat exchange chamber 18 via conduit means 28 and withdrawn from heat exchange chamber 18 via conduit means 27. It is within the scope of this invention to employ a vapor or a liquid as said heat exchange medium 17. Although two reactor tubes 14 are herein illustrated, it is within the scope of this invention to employ a single reactor tube or additional reactor tubes.

The catalyst and vaporous stream passes from heat exchange chamber 18 into separation chamber 19 wherein separation between the catalyst and vaporous product is effected. As herein illustrated, conventional cyclone separators 20 are employed to aid in the separation of the catalyst from the vaporous product stream. An effluent vaporous product stream is withdrawn from separation chamber 19 via conduit means 21. The catalyst is permitted to settle into a settling zone 22 and is returned via conduit means 16 to the catalyst chamber 23. In passing the catalyst through heat exchange chamber 18 and through the heat exchange medium within heat exchange chamber 18, the temperature of the catalyst within catalyst chamber 23 is controlled. The rate of return of catalyst to catalyst chamber 23 is controlled by conventional catalyst valve means 25. Although only one catalyst return tube is illustrated, it is within the scope of this invention to employ a plurality of catalyst return tubes.

It is within the scope of this invention to utilize the fluidizing gas as a means of regenerating the catalyst within catalyst chamber 23, as required. As illustrated, the regeneration gas will pass upwardly through reactor tubes 14 to separation chamber 19 and from separation chamber 19 via conduit means 21. It is also within the scope of this invention to employ a means, not herein illustrated, of passing the regeneration gas from catalyst chamber 23 by a direct conduit outlet means communicating with the upper region of catalyst chamber 23.

The inventive catalytic process and apparatus therefor is applicable to both endothermic and exothermic catalytic reactions wherein a vaporous reaction is conducted in the presence of a solid catalyst. It is particularly applicable to those catalytic reactions that are highly exothermic and wherein it is desired that the heat of reaction be removed quickly from the reaction zone.

The fluidizing gas passed to the catalyst chamber 23 via conduit means 12 can comprise a vaporous reactant feed component or a gas inert to the reaction process.

The following highly exothermic catalytic reaction process is presented as illustrating the invention and advantages thereof.

A hydrogen and vaporous benzene reactant feed is preheated to a temperature of 300° F. and passed via conduit means 11 to catalyst chamber 23. A fluidizing gas comprising hydrogen is passed via conduit 12 to distributing means 26. A dilute catalyst phase is prepared by admixing a nickel catalyst with the upward flowing hydrogen and benzene vaporous feed, and the combined mixture passed upwardly through conduit means 14 into heat exchange chamber 18. Hydrogen in excess of the stoichiometric quantity required is present in the upward flowing reaction mixture.

Water as a coolant is transmitted to heat exchange chamber 18 via conduit means 28 and withdrawn via conduit means 27 so as to maintain a maximum reaction temperature within the reactor tubes 14 of 500° F.

An effluent cyclohexane product stream is separated from the catalyst in separation chamber 19 and withdrawn from separation chamber 19 via conduit means 21. The catalyst separated from the effluent product stream settles in settling zone 22 and flows downwardly through conduit 16 to catalyst chamber 23. The temperature of the catalyst returned to catalyst chamber 23 is 300° F.

As will be evident to those skilled in the art, various modifications of this invention can be made, or followed, in the light of the foregoing disclosure and discussion without departing from the spirit or the scope thereof.

I claim:

1. An exothermic catalytic process which comprises passing a vaporous reaction feed to a contact zone, passing a solid catalyst to said contact zone, passing a mixture comprising said reactant feed and said catalyst from said contact zone upwardly through a reaction zone, maintaining a cooling heat exchange medium in said reaction zone in indirect heat exchange with said mixture passing upwardly through said reaction zone, passing an effluent catalyst and vaporous product mixture from said reaction zone to a separation zone, withdrawing said catalyst from said separation zone and passing said catalyst downwardly through said reaction zone in indirect heat exchange with said cooling heat exchange medium, passing said catalyst from said reaction zone to said contact zone, and passing from said separation zone a vaporous product stream.

2. A catalytic process which comprises passing hydrogen and vaporous benzene to a contact zone, passing a nickel catalyst to said contact zone, passing a mixture comprising said hydrogen, benzene and catalyst from said contact zone upwardly through a reaction zone, maintaining water in said reaction zone in indirect heat exchange with said mixture, passing a cyclohexane and catalyst mixture from said reaction zone to a separation zone, passing from said separation zone a vaporous cyclohexane product stream, withdrawing said nickel catalyst from said separation zone, passing said nickel catalyst downwardly through said reaction zone in indirect heat exchange with said water, and passing said nickel catalyst from said reaction zone to said contact zone.

3. Apparatus comprising, in combination, a contact chamber, a heat exchange chamber positioned above and adjacent said contact chamber, a separation chamber positioned above and adjacent said heat exchange chamber, at least one vertical reactor tube positioned within said heat exchange chamber and in communication with said contact chamber and said separation chamber, a solid catalyst bed in said contact chamber, means for fluidizing said catalyst within said contact chamber, first conduit means communicating with said fluidizing means, second vapor inlet conduit means communicating with said contact chamber, third catalyst conduit inlet means in communication with said contact chamber, means for mixing a vaporous feed flowing through said second conduit means with said fluidized catalyst, fourth conduit means communicating with the lower region of said heat exchange chamber, fifth conduit means communicating with the upper region of said heat exchange chamber, means for separating solid catalyst from a catalyst and vaporous mixture in said separation chamber, sixth vaporous outlet conduit means communicating with said contact chamber, and seventh conduit means for passing said separated catalyst from said separation chamber downwardly through said heat exchange chamber to said contact chamber.

References Cited by the Examiner

UNITED STATES PATENTS

| | | | |
|---|---|---|---|
| 1,345,589 | 7/20 | Ellis | 260—667 |
| 2,515,684 | 7/50 | Van Der Hoeven | 260—667 |
| 2,629,684 | 2/53 | Leffer | 260—672 |
| 2,762,819 | 9/56 | Bollens | 260—667 |
| 2,765,617 | 10/56 | Glusenkamp et al. | 260—667 |
| 2,768,983 | 10/56 | Couper et al. | 260—683.15 |
| 2,846,488 | 8/58 | Miller | 260—667 |
| 2,927,140 | 3/60 | Kaarsemaker et al. | 260—667 |
| 3,030,430 | 4/62 | Duntop et al. | 260—667 |
| 3,070,640 | 12/62 | Pfeiffer et al. | 260—667 |

ALPHONSO D. SULLIVAN, *Primary Examiner.*